United States Patent [19]

Poulin

[11] 4,304,283
[45] Dec. 8, 1981

[54] TIRE CHANGING MACHINE

[76] Inventor: Jean d'Arc Poulin, 75 des Recollets St., Saint Joseph de Beauce, Prov. of Quebec, Canada

[21] Appl. No.: 157,351

[22] Filed: Jun. 9, 1980

[51] Int. Cl.³ ............................................. B60C 25/06
[52] U.S. Cl. ................................................... 157/1.2
[58] Field of Search ...................... 157/1.17, 1.2, 1.26

[56] References Cited

U.S. PATENT DOCUMENTS

| | | | |
|---|---|---|---|
| 2,537,189 | 9/1951 | King | 157/1.17 |
| 2,720,915 | 10/1955 | Lenoir | 157/1.17 |
| 2,815,803 | 12/1957 | Bochert | 157/1.2 |
| 2,818,108 | 12/1957 | Wells | 157/1.2 |
| 3,158,190 | 11/1964 | Foster | 157/1.17 |
| 3,164,198 | 1/1965 | Bishman et al. | 157/1.17 |
| 3,231,001 | 1/1966 | Dragoo et al. | 157/1.17 |
| 3,259,168 | 7/1966 | Schultz et al. | 157/1.26 |
| 3,581,795 | 6/1971 | Bunch et al. | 157/1.2 |
| 3,612,140 | 10/1971 | Malinski | 157/1.17 |
| 3,807,478 | 4/1974 | Mott | 157/1.24 |
| 3,815,653 | 6/1974 | Scott et al. | 157/1.2 |
| 3,851,696 | 12/1974 | Pihlaja | |
| 3,853,165 | 12/1974 | Collmann | 157/1.2 |
| 3,857,430 | 12/1974 | Harnois et al. | 157/1.2 |

*Primary Examiner*—James G. Smith

[57] ABSTRACT

A tire changing machine of simple and rugged construction particularly for changing the tires of truck wheels and characterized by a construction allowing readily adjustment to different sizes of tires and allowing fast tire changing operation solely by axially pushing the rim out of the tire while simply clamping down the latter on a base. This tire changing machine comprises a base having opposite ends and defining an intermediate cavity, a lifting linkage system in the cavity carrying a wheel rim carrying plate, a hydraulic cylinder actuating the linkage system to lift the wheel rim carrying plate, and tire clamps pivotally connected on the opposite ends respectively of the base and having jaws adjustable to different sizes of rims and clamping down the tire around a rim on the wheel rim carrying plate.

8 Claims, 14 Drawing Figures

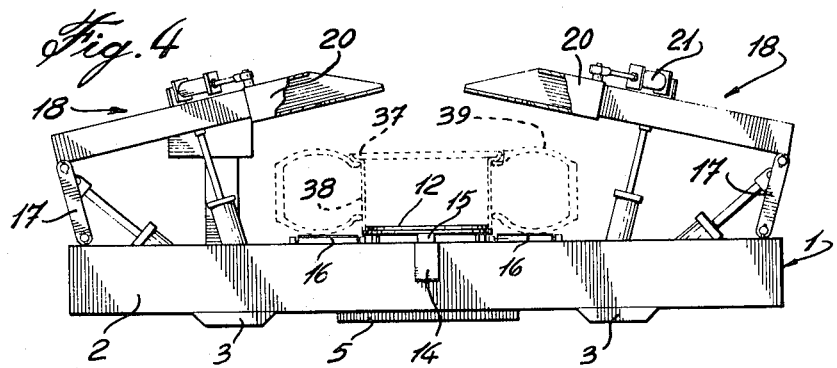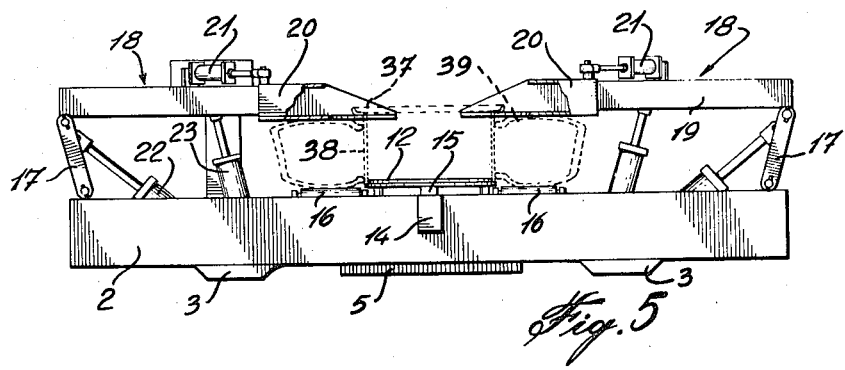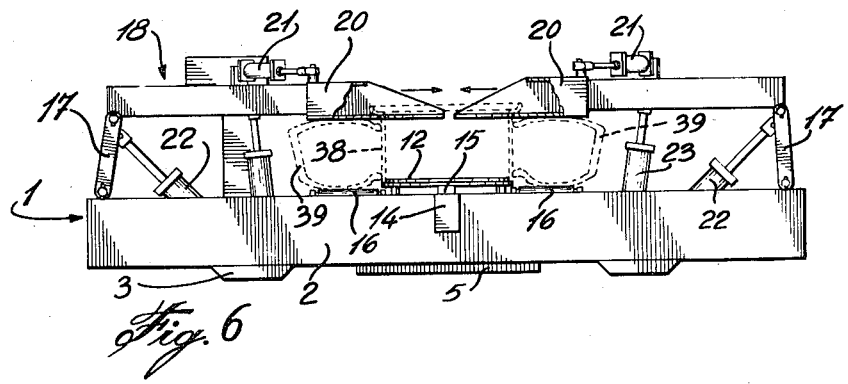

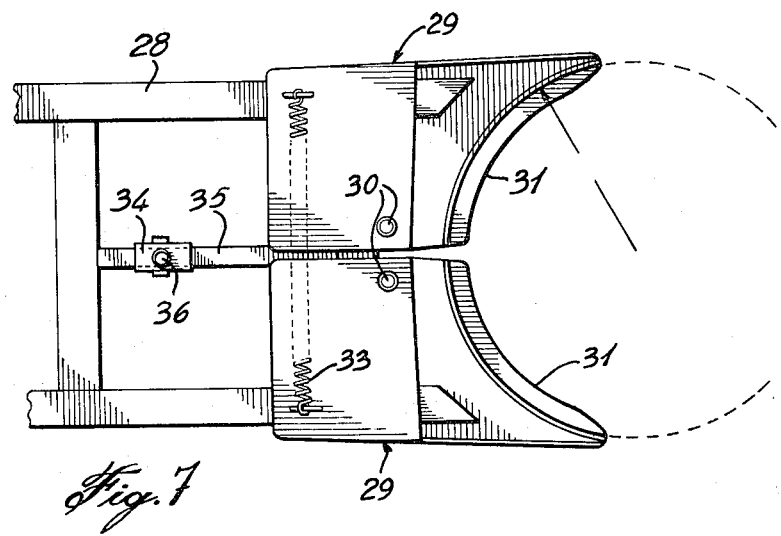
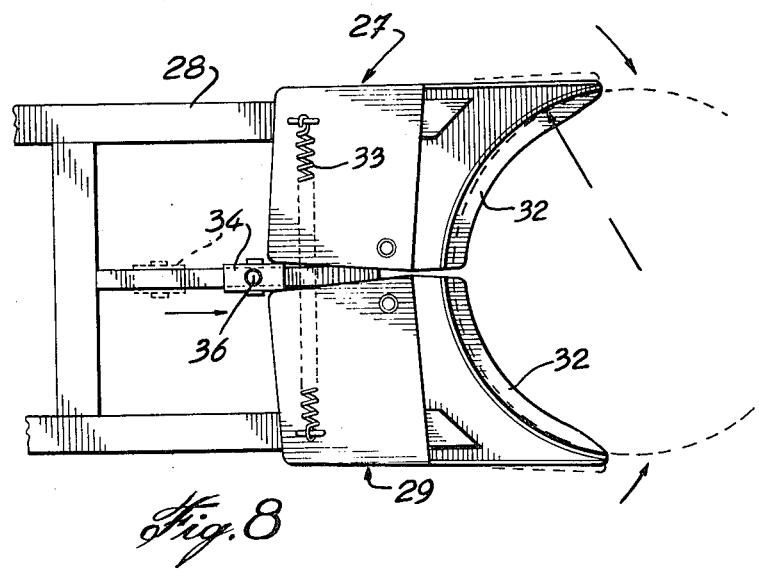

TIRE CHANGING MACHINE

FIELD OF THE INVENTION

This invention relates to a machine adapted to change the tires of wheels and in particular of truck wheels.

BACKGROUND OF THE INVENTION

There have been proposed many types of tire changing machines even including some particularly adapted for truck wheels. Those machines that have been proposed so far have rather complex mechanisms to disengage the beads and/or the removal flange, and/or to separate the wheel rim from the tire. Besides, those tire changing machines that have been proposed so far require many operations that slow down the work, and/or they are not readily and easily adjustable to wheels of different sizes.

SUMMARY OF THE INVENTION

It is a general object of the present invention to provide a tire changing machine that avoids the aforementioned disadvantages.

It is an object of the present invention to provide a tire changing machine that is of simple and rugged construction for fast and easy tire changing operation.

It is another object of the present invention to provide a tire changing machine that is readily and easily adjustable to different sizes of wheels.

It is a more specific object of the present invention to provide a tire changing machine wherein the tire and rim of a wheel are separated from each other solely by axially pushing the rim out of the tire while simply clamping down the latter on a base.

BRIEF DESCRIPTION OF THE DRAWINGS

The above and other objects and advantages of the present invention will be better understood with reference to the following description of a preferred embodiment thereof which is illustrated, by way of example, in the accompanying drawings, in which:

FIGS. 4, 5 and 6 are elevation views of the tire changing machine sequentially illustrating its operation;

FIGS. 7, 8 and 9 are top views of a portion of one embodiment of a tire clamp sequentially illustrating the operation of a pair of jaws thereof;

DESCRIPTION OF A PREFERRED EMBODIMENT

Figure 3:
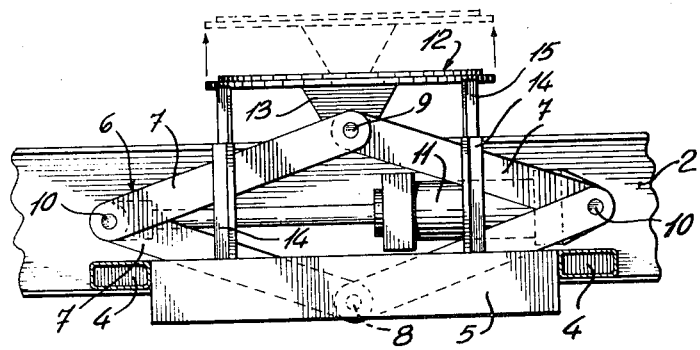
FIG. 3 is a side elevation of a central portion of the machine particularly showing a parallelogram linkage system and a wheel rim carrying plate mounted thereon to lift a wheel rim out of a tire engaged around it.

The illustrated tire changing machine comprises a base 1 including an elongated rectangular frame 2 having feet 3 to carry it off the ground. The elongated frame thus defines opposite ends and an intermediate cavity in which there are secured cross-pieces 4 and longitudinal bars 5 forming part of the frame, as shown in FIG. 3.

A lifting parallelogram linkage system 6 is mounted in the intermediate cavity defined by the frame 1. The linkage system includes arms or links 7 that are interconnected by a bottom, a top and two lateral articulations defined by the pivots 8, 9 and 10,10. The axes of the latter are parallel and extend transversely of the frame 2. The bottom articulation is secured to the frame by engagement of its pivot 8 with the longitudinal bars 5. A hydraulic cylinder 11 is connected at its opposite ends to the pivots 10,10 of the lateral articulations to vertically displace the top pivot 9.

A wheel rim carrying plate 12 is hinged at the top articulation by connection of the depending bracket 13 to the pivot 9. The plate 12 is vertically displaceable with the top articulation. Vertical guides upwardly project endwise from the members 4 and 5 and are positioned around the aforementioned cavity and wheel rim carrying plate 12 to guide the latter in its vertical displacement. Each such vertical guide includes a fixed vertical guideway formed by a channel member 14 and also includes a movable member 15 fixed to the underside of plate 12 and slidable endwise vertically in a corresponding channel member 14. The vertical guides prevent tilting of plate 12 in the longitudinal direction of the frame 2 about the axis of the pivot 9.

A pair of rollers 16 are rotatively installed longitudinally of the frame on one side thereof to radially project upwardly and laterally of the frame 2, as shown. These rollers 16 are provided to rest a wheel flat thereon to roll the same on or off the rim carrying plate 12 with less efforts.

On each end of the elongated frame, there are pivotally connected at one end a pair of arms or links 17. On the other end of each pair of arms 17, there is pivoted at its outer and a tire clamp 18. The pivotal axes at the ends of the links 17 are parallel to each other and extend transversely relative to the elongated frame 2.

Figure 12:
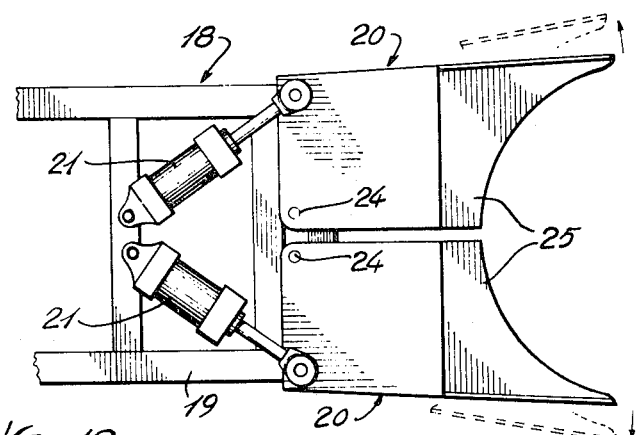
FIG. 12 is a top partial view of another embodiment of a tire clamp according to the present invention and particularly illustrating a pair of jaws forming part of the tire clamp.
Figure 13:
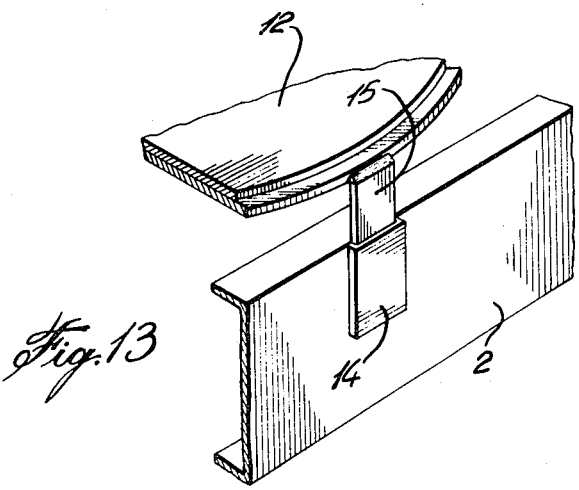
FIG. 13 is a perspective view of a guide and the associated wheel rim carrying plate forming part of the tire changing machine of FIGS. 1 to 6 inclusive.
Figure 14:
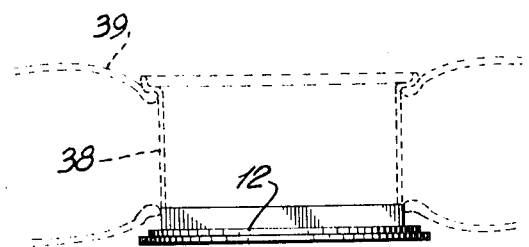
FIG. 14 is an elevation view of a wheel rim carrying plate operatively carrying a wheel rim according to the present invention.

Each tire clamp 18 comprises a rugged frame 19, a pair of jaws 20, and hydraulic cylinders 21 to pivot the jaws. For each tire clamp 18, there are a pair of hydraulic cylinders 22 and 23 connected at one end to the corresponding arm 17 and tire clamp frame 19 respectively and at the other end to the frame 2 to separately actuate the arm 17 and the tire clamp 18. The jaws 20 are pivoted on the inner end of the tire clamp frames 19 through pivots 24, shown in FIG. 12, by means of the hydraulic cylinders 21,21. Each jaw 20 is formed with an arc-shaped edge 25 adapted to cooperatively engage around a wheel rim. The actuation of the jaws 20 by the hydraulic cylinders 21 allows to vary the overall curvature cooperatively defined by the edge 25 of the two jaws and to thus adjust for rims of different diameters. In FIG. 12, there is shown a position for a smaller rim, in full lines, and a position for a larger rim in dashed lines.

A control unit 26 is mounted on the front side of the machine, the side of the rollers 16, and is connected and constructed to operate either of the aforementioned hydraulic actuators or cylinders.

Figure 9:
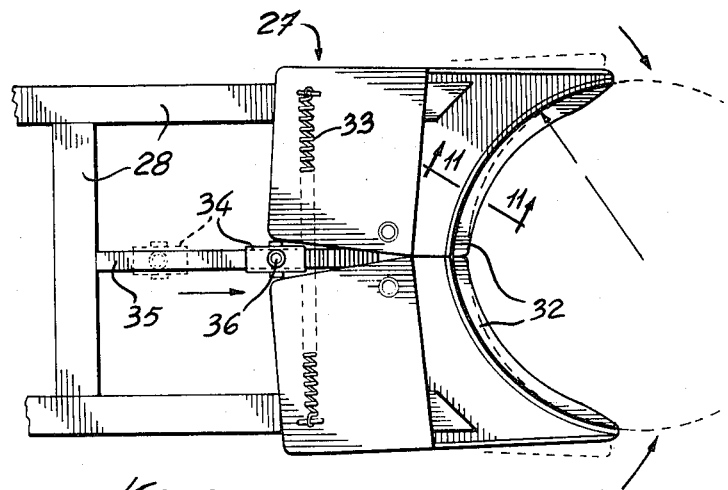
Figure 10:
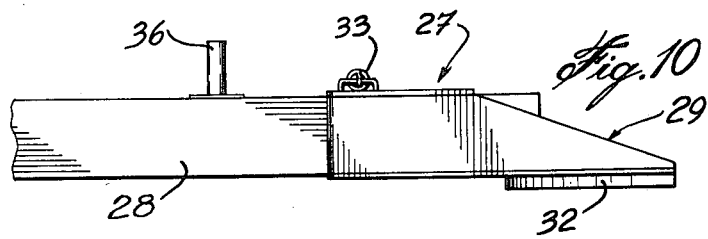
FIG. 10 is a side elevation view of the tire clamp of FIGS. 7, 8 and 9.
Figure 11:
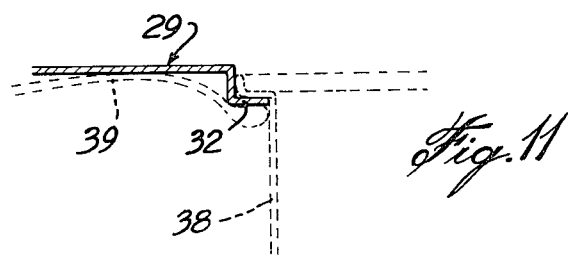
FIG. 11 is a cross-sectional view as seen along line 11—11 in FIG. 9.

FIGS. 7 to 11 inclusive illustrate another embodiment of tire clamps, the tire clamp 27, to replace the aforedescribed tire clamp 18. The tire clamp 27 comprises a frame 28. A pair of jaws 29 are pivoted on the inner end of the tire clamp frame 19 by pivots 30. Each jaw 29 is formed with an arc-shaped edge 31 which, as best shown in FIGS. 10 and 11, is transversely shaped to form a depressed portion 32 to easily and readily engage under the flange of a rim and thus break the bead loose from the flange. A spring 33 interconnects the jaws 29 and bias the same in outward direction relative to clamping engagement thereof with the rim. A block or slider 34 slides longitudinally of the base 1 on a guide bar 35 of the tire clamping frame 28 in longitudinal alignment to engage between the jaws 29, as shown in FIGS. 8 and 9, to wedge the jaws in opposite angular direction relative to the biasing direction by the spring 33. A handle 36 projects upward from the adjustment block 34 to actuate the latter.

A wheel is rolled on the rollers 16 to be placed in operative position, as shown in dotted lines, with the rim overlying the rim carrying plate 12. If required, the tire clamps 18 or 27 are pivoted outward and upward by the cylinder 22 and 23 respectively to provide enough space to position the wheel as aforementioned.

Figure 1:
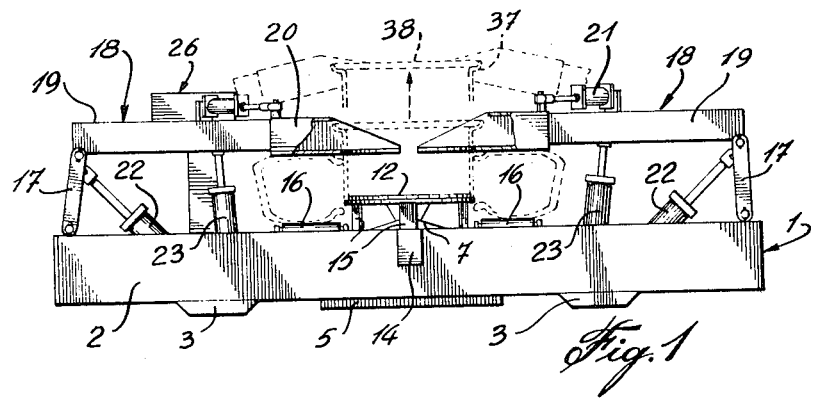
FIG. 1 is a side elevation view of a tire changing machine according to the present invention.
Figure 2:
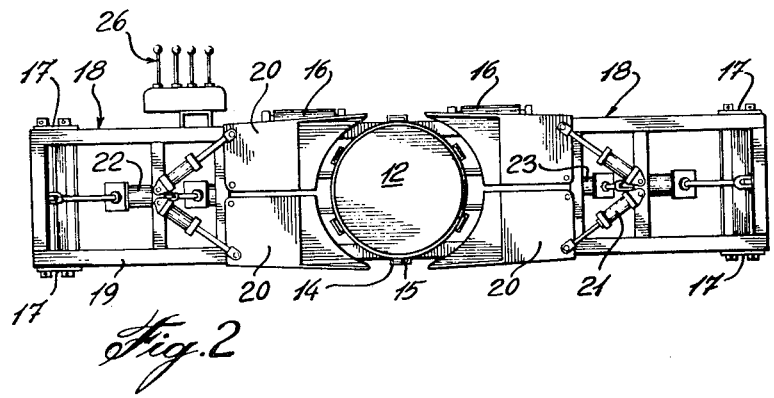
FIG. 2 is a top view of the machine shown in FIG. 1.

It must be noted that the wheel is positioned with the fixed flange 37 of the rim 38 at the top, as shown in FIGS. 1 and 4 to allow unhindered lifting or pushing of the rim axially out of engagement in the tire 39. Of course, this implies that the removable flange, not shown, has been removed from the other side of the rim.

The tire clamps 18 or 27 are thereafter moved inward and downward to the extent required to apply the jaws 20 or 29 on the upward facing side of the tire. This is done irrespective of the size of the wheel, by proper amount of actuation of the cylinders 22 and 23. In particular, the cylinders 22 acting on the links 17 produce more or less inward displacement of the tire clamps in relation to the size of the wheel. The jaws are more or less opened to properly engage under the fixed flange 37 irrespective of the size of the rim 38. This breaks the adherence of the corresponding bead against the fixed flange. While holding the tire clamps down onto the tire, the actuation of the cylinder 11 lifts the plate 12 and thus the rim out of engagement in the center of the tire. The tire clamps are also used to thereafter hold the rim, as shown in dotted lines in FIG. 1, while the tire is removed and replaced by another one. The tire clamps may also be operated to lower the rim onto the new tire and to rest on the rim and push it down inside the tire in proper operative position.

What I claim is:

1. A tire changing machine comprising a base, a wheel rim carrier mounted on said base and upwardly displaceable therefrom, a pair of tire clamps mounted on said base and displaceable relative to said wheel rim carrier toward and away relative to a clamp-down position onto a tire engaged around a wheel rim on the wheel rim carrier, actuation means connected to said tire clamps and operatively displacing the same relative to said wheel rim carrier, powered-lifting means operatively interposed between the base and the wheel rim carrier and selectively lifting the latter, whereby to upwardly push and disengage a wheel rim relative to a tire while the latter is clamped down by said tire clamps and wherein at least one of said tire clamps includes a frame, a pair of jaws transversely displaceable on said frame toward and away relative to clamping engagement with the wheel rim on the wheel rim carrier, and jaw actuator means operatively engaging the pair of jaws and controlling the displacement thereof toward and away relative to clamping engagement with the wheel rim.

2. A tire changing machine as defined in claim 1, wherein said powered lifting means includes a vertically-extensible linkage and a hydraulic cylinder connected at the opposite ends to relatively displaceable articulations on the vertically-extensible linkage, and the wheel rim carrier is pivotally connected to an uppermost articulation of the linkage and upwardly displaceable upon upward extension of the latter by the hydraulic cylinder and vertical guides secured to said base and projecting therefrom around said wheel rim carrier and operatively guiding the latter against tilting of said wheel rim carrier about said uppermost articulation.

3. A tire changing machine as defined in claim 1, wherein said jaw actuator means includes a block engageable between the jaws and wedging the latter in one direction relative to said clamping engagement with the wheel rim and spring means operatively biasing said jaws in opposite direction relative to said one direction.

4. A tire changing machine as defined in claim 3, wherein said block is slidable on the frame of the corresponding clamp and includes a handle for actuation thereof.

5. A tire changing machine as defined in claim 1, further including a pair of links pivotally connecting said tire clamps respectively to said base and said actuation means being connected to said links and to said tire clamps and constructed and arranged to separately and selectively actuate the links and the tire clamps.

6. A tire changing machine as defined in claim 5, wherein said actuation means includes hydraulic cylinders connected to the tire clamps and to said pair of links respectively and individually actuating the same.

7. A tire changing machine as defined in claim 6, wherein said base constitutes an elongated frame defining opposite ends and an intermediate cavity, said wheel rim carrier and powered pushing means are mounted in said cavity, said pair of links have each one end pivoted on a corresponding end of the frame, each of the tire clamps includes an outer end pivoted to the other end of the corresponding link and said tire clamps extend toward each other with the inner end thereof adjoining each other centrally of the frame.

8. A tire changing machine comprising a base including an elongated frame defining opposite ends and an intermediate cavity, a parallelogram linkage system mounted in the intermediate cavity and including links interconnected by a pair of laterally spaced apart articulations and a lower and an upper articulations defining parallel axes extending transversely relative to the elongated frame, a first hydraulic cylinder connected at the opposite ends to the laterally spaced-apart articulations respectively and operatively producing upward displacement of the upper articulation upon displacement of the laterally spaced-apart articulations laterally relative to each other, a wheel rim carrying plate pivotally connected to the upper articulation, and upwardly displaceable therewith, upwardly projecting guides secured to the frame of the base, positioned around said cavity and the wheel rim carrying plate, and preventing tilting of the latter about said upper articulation upon displacement thereof by the first hydraulic cylinder, two pairs of links pivoted to one end each to a corresponding end of the elongated frame about an axis extending transversely of the frame, a pair of tire clamps including each a tire clamp frame and a pair of jaws, each tire clamp frame having an outer end pivoted on the other end of one of the two pairs of links about an axis extending transversely of the elongated frame of the base, each pair of jaws being adjustably connected on the inner end of a corresponding tire clamp frame and being displaceable toward and away relative to clamping engagement with a wheel rim on the wheel rim carrying plate, and other hydraulic cylinders connected at one end to the pairs of links and the tire clamps respectively and at the other end to the elongated frame of the base and individually pivoting each of the pairs of links and the tire clamps to allow tire-changing operation on wheels of different sizes.

* * * * *